United States Patent [19]

Ueda et al.

[11] Patent Number: 4,596,452
[45] Date of Patent: Jun. 24, 1986

[54] THIN DISC CAMERA

[75] Inventors: Hiroshi Ueda, Nara; Akira Yoshizaki, Osaka; Harumi Tanaka, Kobe, all of Japan

[73] Assignee: Minolta Camera Kabushiki Kaisha, Osaka, Japan

[21] Appl. No.: 722,921

[22] Filed: Apr. 12, 1985

[30] Foreign Application Priority Data

Apr. 12, 1984 [JP] Japan .................................. 59-74755
Jul. 25, 1984 [JP] Japan .................................. 59-154919

[51] Int. Cl.⁴ .............................................. G03B 17/02
[52] U.S. Cl. ...................................... 354/121; 354/288
[58] Field of Search .................................. 354/121, 288

[56] References Cited

U.S. PATENT DOCUMENTS 4,451,130  5/1984  Yan .................................. 354/121 X

Primary Examiner—William B. Perkey
Attorney, Agent, or Firm—Wolder, Gross & Yavner

[57] ABSTRACT

A disc camera for use with a disc film cartridge includes upper and lower camera walls spaced from one another by a distance less than the height of the cartridge housed in a cartridge chamber. The upper wall is formed with an opening which allows a part of the cartridge housed in the cartridge chamber to project therefrom. A frame is formed in the cartridge chamber so as to be fitted with an exposure aperture of the cartridge when a rear cover of the camera is closed. The frame serves to prevent exposure of a film in the cartridge to unwanted light. A covering member which protects the projecting part of the cartridge against impact which might be applied thereto also prevents entry of dust into the cartridge chamber.

The opening may be formed on a lower camera wall or on both of the upper and lower camera walls.

11 Claims, 17 Drawing Figures

THIN DISC CAMERA

BACKGROUND OF THE INVENTION

1. Field of the Invention

The present invention relates to improvements in a camera, that is a camera utilizing a disc film cartridge of the type disclosed in U.S. Pat. No. 4,194,822.

2. Description of the Prior Art

It is desirable to reduce a camera in size as much as possible to facilitate the handling and operation thereof. However, since the size of the film cartridge employed is predetermined, the camera must be at least of a size capable of accommodating the film cartridge. Accordingly, any reduction in the size of the camera body has been limited.

FIG. 1 of the drawings shows a disc camera 1 accommodating a disc type film cartridge which has been widely used. Since this film cartridge is thin and flat, the camera 1 can be thin in the transverse direction, namely in the direction of the optical axis of objective or taking lens. However, it is difficult to reduce the size of the camera in the direction perpendicular to the optical axis. For example, since it is necessary for the camera to house the film cartridge in a light-tight manner so that the film is not exposed to unwanted light, it is difficult to set the height $H_o$ of the camera 1 to less than the height $L_1$ of the film cartridge FC loaded in the camera 1 and, accordingly, it is impossible to make the size of the camera less than that of the film cartridge as will be described hereinafter in more detail.

A film cartridge FC is perfectly accommodated within a cartridge chamber 2a formed in a camera body 2. A rear cover which covers the cartridge chamber 2a is provided at the rear of the camera body 2. A projection pawl (not shown) is provided at the rear cover. The rear cover is locked in the closed position with this pawl engaged with the aperture 2c formed between the upper edge $FC_1$ of the film cartridge and the upper wall 2b of the camera body. The engagement of the pawl is achieved or released when the lever 3, which is provided almost parallel to the upper surface of the camera upper wall 2b of the camera body 2 is operated with the rear cover held in the closed position. The height of the film cartridge FC is represented by $L_1$, the thickness of the upper and lower walls of the camera body 2 by $L_3$ and $L_4$ respectively, the height of the aperture 2c by $L_2$, and the height of the lever 3 measured from the upper surface of the upper wall of the camera body 1 by $L_5$ in the case the camera 1 is constructed as described above. In this case, the distance between the upper edge $FC_1$ of the film cartridge FC and the internal surface of the upper wall 2b of the camera body must be larger than $L_2$ in order to provide for the aperture 2c having the height $L_2$ between the upper edge $FC_1$ of the film cartridge FC and the internal surface of the upper wall 2b of the camera body. Accordingly, it has been impossible to make the total height of the camera smaller than the size $H_0$ which is a little larger than the total sum of heights $L_1$ to $L_5$.

SUMMARY OF THE INVENTION

It is an object of the present invention to provide a disc camera which is reduced in size by allowing a part of a loaded disc film cartridge to project through at least one of the upper and lower camera walls while being capable of preventing exposure of the film in the cartridge to unwanted light.

Another object of the present invention is to provide a disc camera which has the feature described above and which protects the projecting part of the cartridge against impact to which it might be exposed as well as of preventing the entry of dust into the cartridge chamber.

To accomplish these objects, a disc camera of the present invention is provided with upper and lower camera walls which are spaced from one another by a distance shorter than the height of a disc film cartridge housed in the cartridge chamber. At least one of the upper and lower camera walls is provided with an opening for allowing a part of the cartridge housed in the cartridge chamber to project therefrom. Since the opening allows unwanted light to enter into the cartridge chamber, the camera is provided with shielding means for shielding the exposure aperture of the cartridge housed in the cartridge chamber so that the film in the cartridge is not exposed to the unwanted light. The camera is further provided with covering means for covering the projecting part of the cartridge. The covering means serves to protect the projecting part of the cartridge against impact which might be otherwise applied thereto as well as to prevent dust from entering into the cartridge chamber through the opening.

The above and other objects, features, and advantages of the present invention will become more apparent from the following description of preferred embodiments of the present invention taken along with the accompanying drawings.

DESCRIPTION OF THE PREFERRED EMBODIMENTS

Figure 1:
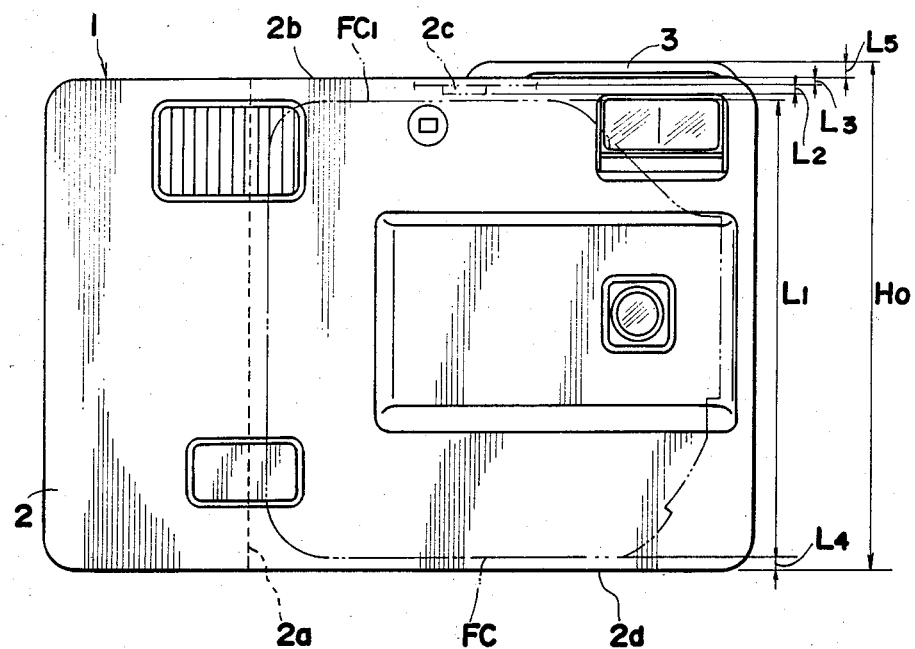
FIG. 1 is a front elevation view of the camera of the prior art which utilizes a disc type film cartridge.
Figure 2:
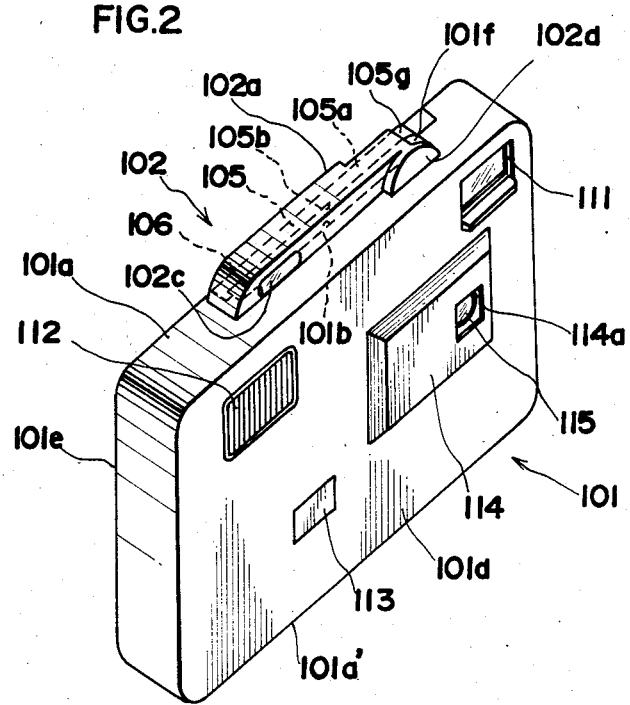
FIG. 2 is a perspective view of a camera according to a first embodiment of the present invention.

In FIG. 2, the appearance of a camera according to the first embodiment is shown with the front of the camera facing right. The camera 101 is thin and flat in the transverse direction and accommodates therein a disc type film cartridge which is now shown. A bulging or swollen part 114 is formed at the right side of the central area of the front side 101d of the camera 101 and a picture-taking aperture 114a at the right side of bulging part 114. Provided at the inside of the picture-taking aperture 114a is a taking or objective lens 115.

At the upper right side corner of the front side 101d of the camera 101 a viewfinder window 111 is formed and an electronic flash unit 112 is provided at the upper left corner of the same front side 101d and a shutter-releasing button 113 is located at the lower left side of the front side.

The rear surface 101e of camera 101 is flat and the rear cover 105 is a part of said flat surface. When the rear cover 105 is closed, the rear surface 101e and the rear cover 105 form one flat surface. The rear cover 105 is pivotted so that it can rotate around the axis extending laterally in the vicinity of the bottom part of camera 101. When the rear cover rotates to the release or open position, the cartridge chamber is opened and a film cartridge can be loaded or removed.

Figure 4:
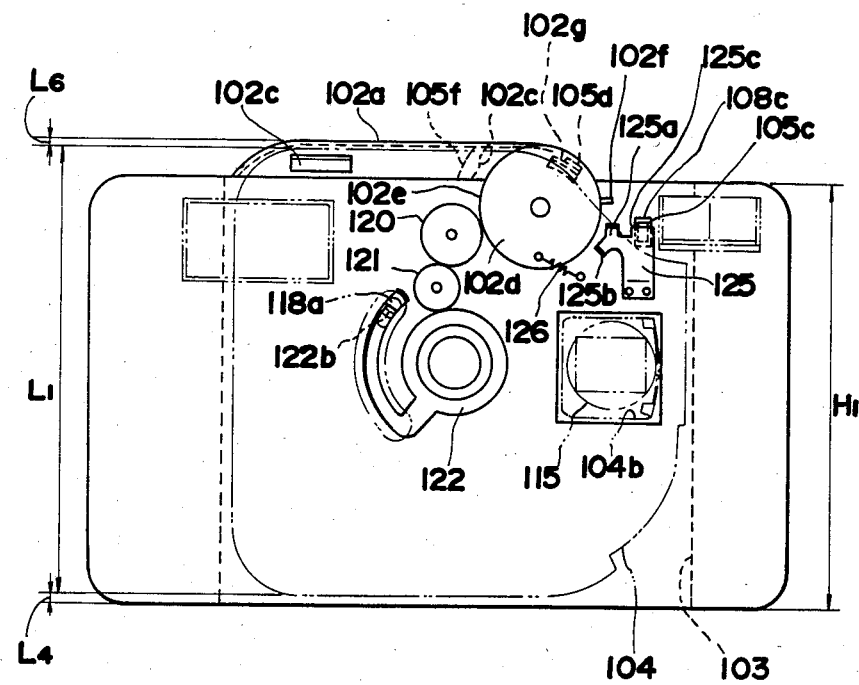
FIG. 4 is an explanatory front illustration of the internal mechanism of the camera shown in FIG. 2.

With reference to FIG. 4, outer size of camera 101 is explained. The height of camera body 101, namely the distance $H_1$ between the upper surface 101a and the lower surface 101a' is less than the height $L_1$ of loaded film cartridge 104. Accordingly, a part of film cartridge 104 always protrudes from the camera 101.

Therefore, an aperture like a slip or slot is formed in the upper surface of camera 101 in order to allow the protrusion of the film cartridge 104. Specifically, recesses 101b, 105b are opposingly formed in the upper surface 101a of camera 101 and the upper surface 105a of rear cover 105. When the rear cover 105 is closed, an aperture or slot 106 is formed because the opposing recesses 101b and 105b are coupled. Formed of the right end portions of recesses 101b, 105b are respectively upwardly projecting convex protrusions 101f, 105g. An aperture 101g is formed in the upper surface 101a of camera 101 and extends forwardly from the protrusion 101f. The part between the aperture 101g and recess 101b is separated by a wall 108 which defines a front wall of the cartridge chamber and the part of the side of recess 101b from said wall 108 is within the cartridge chamber, while the part on the side of aperture 101g is within the camera. The wall part 108 is also provided with apertures 108c and 108d.

On the other hand, an upright wall 105f is formed at the rear side of the camera and of the protrusion 105g, shielding the rear side of the camera. A forwardly projecting protrusion 105d is formed at the lower part of protrusion 105g and another forwardly projecting protrusion 105c is formed near protrusion 105d. Thereby, when the rear cover 105 is closed, protrusions 105d, 105c are engaged respectively with the apertures 108d, 108c in wall 108. A groove 105e is formed in the lower surface of protrusion 105d.

A lock member 102 is provided at the upper surface of camera 101 in order to cover aperture 106. Lock member 102 includes a lever 102a which extends laterally and a gear 102d which is integrally formed at one end of lever 102a. The lock member 102 is pivotted so that at least one-half of the gear 102d engages the aperture 101g formed in the camera upper surface 101a and rotates around an axis which is almost parallel with the axis of the taking lens. The lock member rotates in a range between the lock position wherein the lever 102 abuts or comes close to the upper surface of the camera, covering said aperture 106 and the unlock position wherein the lever 102 rotates clockwise for about 45 degrees from said lock position, opening the aperture 106. The lever 102a is of U-shaped transverse cross-section and has a depth sufficient to cover the part of the film cartridge protruding from the camera when lock member 102 is located at the lock position.

A cut-away part 102c is formed in the rear wall 102b of the right end part of lever 102a so that it does not interfere with the rotation of lock member 102 since when the lever 102a covers the aperture 106, the cut-away part 102c registers with standing wall 105f so that under such condition the aperture 106 is not exposed to the outside. The rear wall 102b and standing wall 105f also function to lock the rear cover in closed position. Namely, when the lock member 102 is located at the lock position, the rear cover cannot move to the open position because a part of rear wall 102b and a part of standing wall 105f overlap. When the lock member 102 rotates, overlap of rear wall 102b and standing wall 105f is retracted just before it reaches the unlock position and, thereby, the rear cover can be opened.

The gear part 102d of lock member 102 is formed with teeth 102e, a pawl 102f which projects radially outward, and an arcuate engaging part 102g which terminates in a part which projects radially forward relative to gear part 102d. The engaging part 102g is located so that the end part thereof is engaged with groove 105e of protrusion 105d formed at the rear cover 105.

The lock member 102 is urged counterclockwise by a spring 126. Within the camera body, the teeth 102e of gear part 102d engage the gear 120 which is coupled with an exposure window cover interlocking member 122 through a gear 121. Exposure window cover interlocking member 122 is rotably supported coaxially with the disc film winding axis and is provided with a pawl 122b. This pawl 122b opens or closes the exposure window formed on the film cartridge. Specifically, the film cartridge is provided with a cover member for shielding an exposure window. When the film cartridge is positioned in the cartridge chamber, the pawl 122b engages the pawl 118a of the cover member 118 shielding the exposure window, and the pawl 122b rotates clockwise to drive the pawl 118a to retract the cover member 118 from the exposure window.

A leaf spring 125 is located on the camera inside face of wall 108. The leaf spring 125 extends along a plane perpendicular to the axis of taking lens 115 with one end fixed and the other end free. The spring free end is located on the front side of aperture 108c formed in the wall 108 and is elastic in the direction of the lens axis. A part of leaf spring 125 is bent perpendicularly to form an arm 125b located within the rotating locus of pawl 102f formed on gear part 102d.

Figure 5:
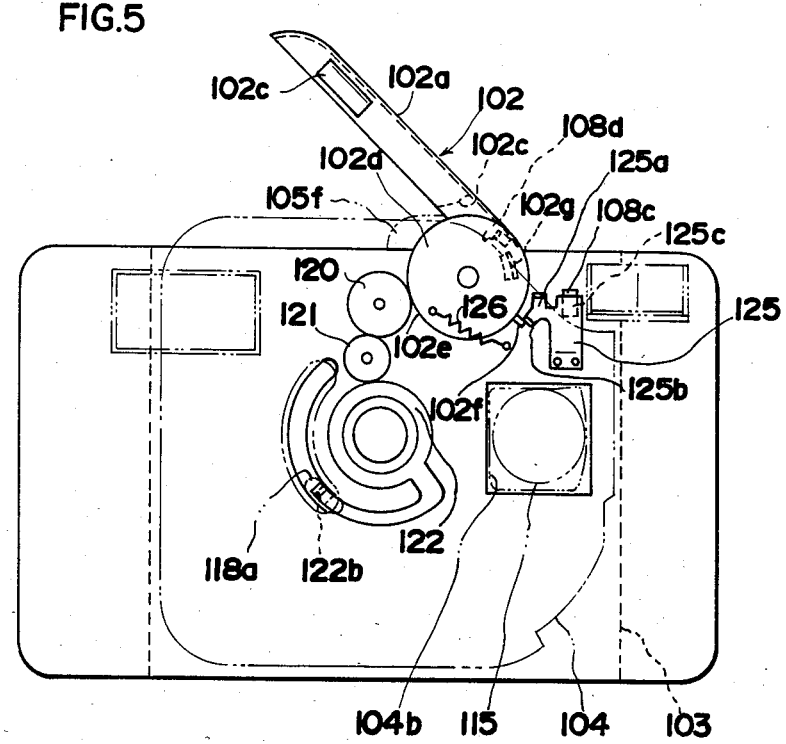
FIG. 5 is another explanatory front view of the internal mechanism of the camera shown in FIG. 2.
Figure 6:
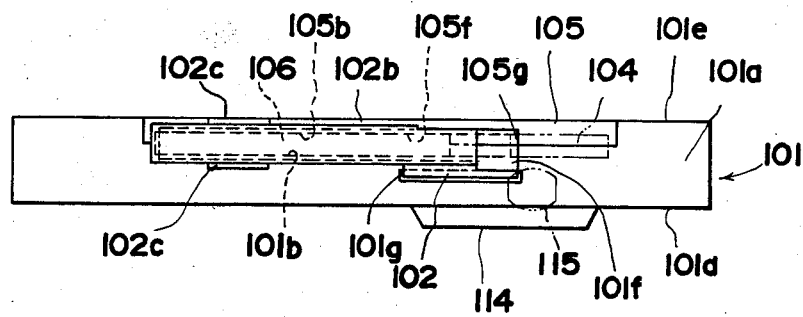
FIG. 6 is a plan view of the camera shown in FIG. 2.

Functioning of the above described structure is hereinafter explained. First, in the condition where the rear cover is closed as shown in FIG. 4, the lock member 102 is urged by the spring 126 to and is located at its lock position. In this case, the engaging part 102g engages the groove 105e, causing the rear cover to be locked. The lever 102a is rotated clockwise from this condition by raising the finger hook 102c on lever 102a. Thereby, the gear part 102d rotates clockwise with the lever 102a and the end of engaging part 102g is separated from the groove 105e just before the end of such rotation, unlocking rear cover 105. When the clockwise operating force is removed after the rotation of lever 102a, a predetermined angle, the lever 102a rotates a little counterclockwise under the influence of spring 126 and moves to the position of FIG. 5, causing the pawl 102f to abut the stop 125b of leaf spring 125 and the lock member 102 to be stopped against the urging of spring 126.

Thereafter, a film cartridge 104 is loaded in the cartridge chamber 103 and the rear cover 105 is closed. In this case, a part of film cartridge 104 projects through the aperture 106. When the rear cover 105 is closed, the protrusions 105c, 105d engage the apertures 108c, 108d formed on the wall 108. The protrusion 105c abuts spring part 125c of plate spring 125 pressing it and deflecting the leaf spring 125. Thereby, the stop 125b disengages from the pawl 102f and the lock member 102 rotates counterclockwise under the influence of spring 126. When the lock member 102 rotates, the end part of engaging part 102g engages groove 105e of protrusion 105d which projects through the aperture 108d in the initial stage of rotation and the rear cover 105 is locked. Rotation of gear part 102d is transmitted to the exposure window cover'interlocking member 122 through the gears 120, 121, the pawl 122b rotates clockwise, driving the pawl 118a, and thereby retract the cover member 118 from and open the exposure window 104b.

When the film cartridge is loaded, a frame or shield in the camera body engages the exposure window 104b, shielding the film surface from the light. Moreover, when the lock member 102 further rotates and stops after it abuts or comes close to the upper surface of the camera, the lever 102a perfectly covers the film cartridge projecting through the aperture 106 and the condition shown in FIG. 4 occurs again.

In case it is required to remove the film cartridge, when the lock member 102 is rotated clockwise, the exposure window cover interlocking member 122 rotates counterclockwise with the rotation of the gear part 102d and the exposure window 104b is covered with the cover member 118. Thereafter, the engaging part 102g and groove 105e mutually disengage unlocking and permitting the opening of the rear cover 105.

In this embodiment, as explained above, height $H_1$ of the camera is less than the height $L_1$ of the film cartridge and the protruding part of the film cartridge is covered for its protection by the lever formed on the lock member. Therefore, any possibility, for example, that the protruding film cartridge is damaged by an external force is obviated. Moreover, the entry of dust into the camera through the aperture while no film cartridge is loaded therein and consequent damage to the camera are also obviated.

In this case, as explained above, since the film surface is shielded from the light because the exposure window 104b of film cartridge 104 and the frame in the side of the camera body engage each other, it is permissible for light to leak through the clearance between the internal peripheral edge of aperture 106 and film cartridge 104.

In the above embodiment, since the rear wall 102b of lock member 102 and the standing wall 105f of rear cover 105 function as the opening and closing members which lock the rear cover in closed position, the protrusion 105d and engaging part 102g can be omitted.

Figure 3:
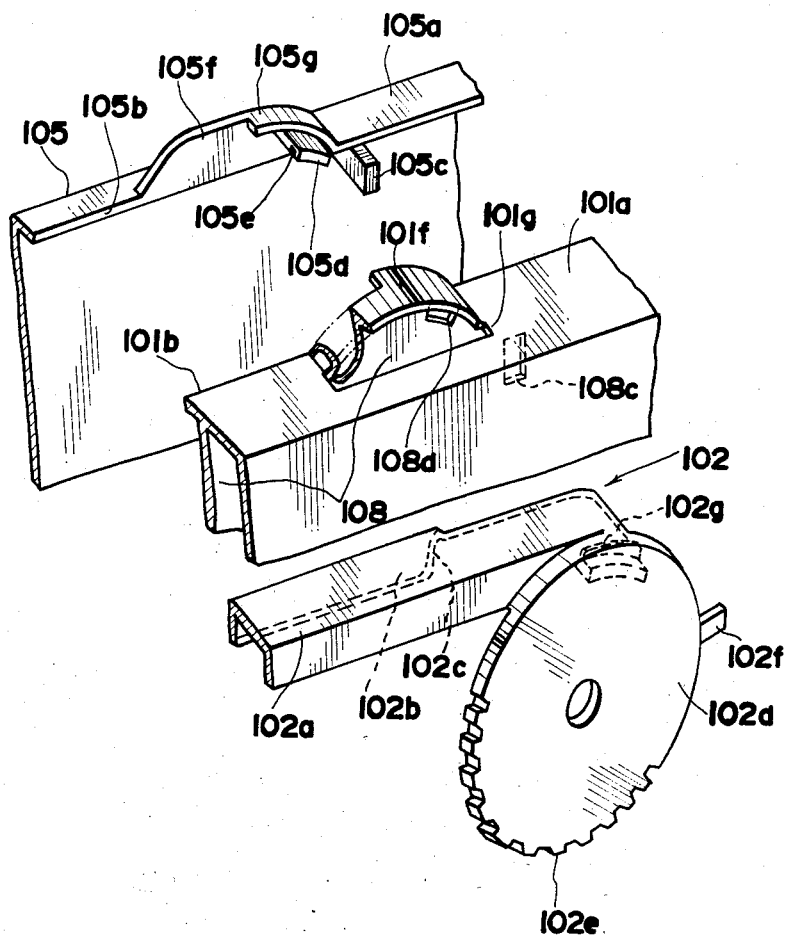
FIG. 3 is an exploded perspective view of an essential part of the camera shown in FIG. 2.
Figure 7:
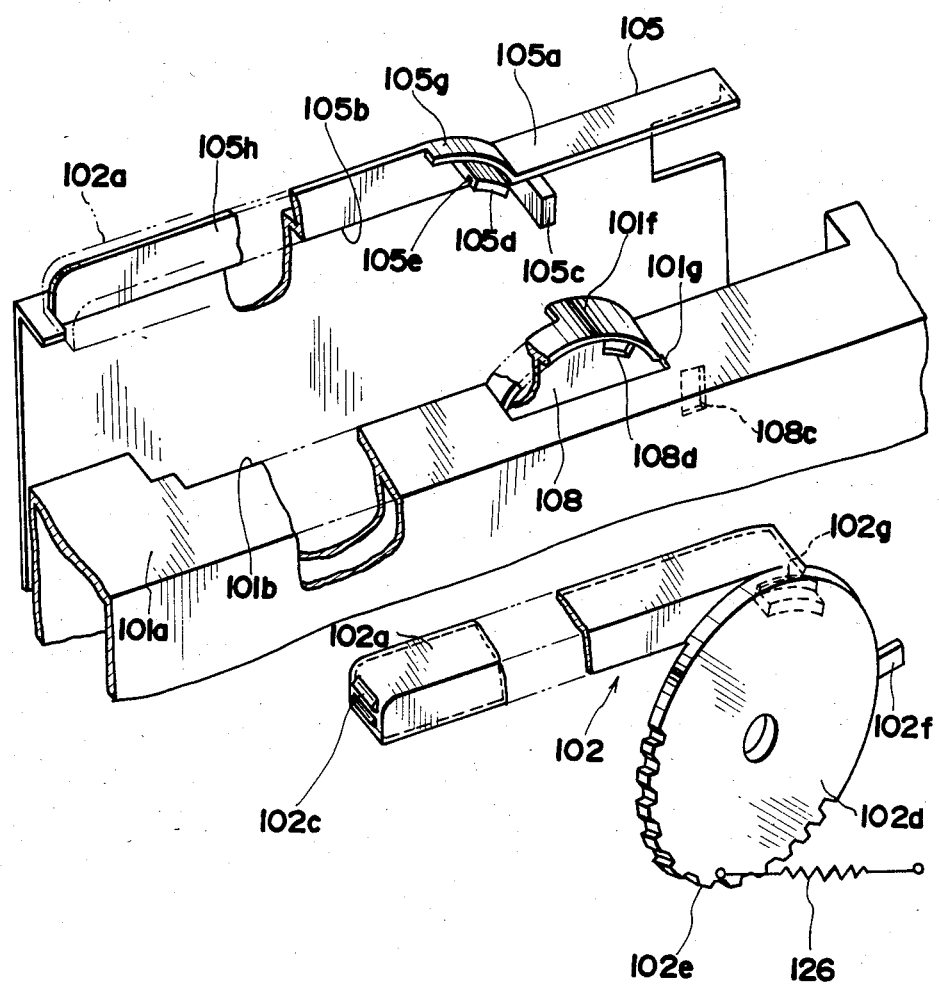
FIG. 7 is an exploded perspective view of an essential part of a camera according to a second embodiment of the present invention.

FIG. 7 illustrates a second embodiment of the present invention and it is noted that like parts having similar functions as those in the first embodiment are designated by like reference numerals. In this embodiment, the only difference is that shape of lever 102a of lock member 102 and the shape of upper surface of rear cover 105 are different from those in said first embodiment. As shown in the figure, the lever 102a is of L-shaped cross-section and the part corresponding to the rear wall of the lever of the first embodiment (102b in FIG. 3) is a vertical integrally formed wall 105h. The finger hook 102c of lever 102a is formed at the end part of lever 102a. The remaining structure is the same as in the first embodiment and is not explained here. In this second embodiment, the rear part of the protrusion of the film cartridge is protected by the upright wall 105h and the upper part and front side thereof by the lever 102a and, simultaneously, the aperture can be covered by the standing wall 105h and the lever 102a.

Figure 8:
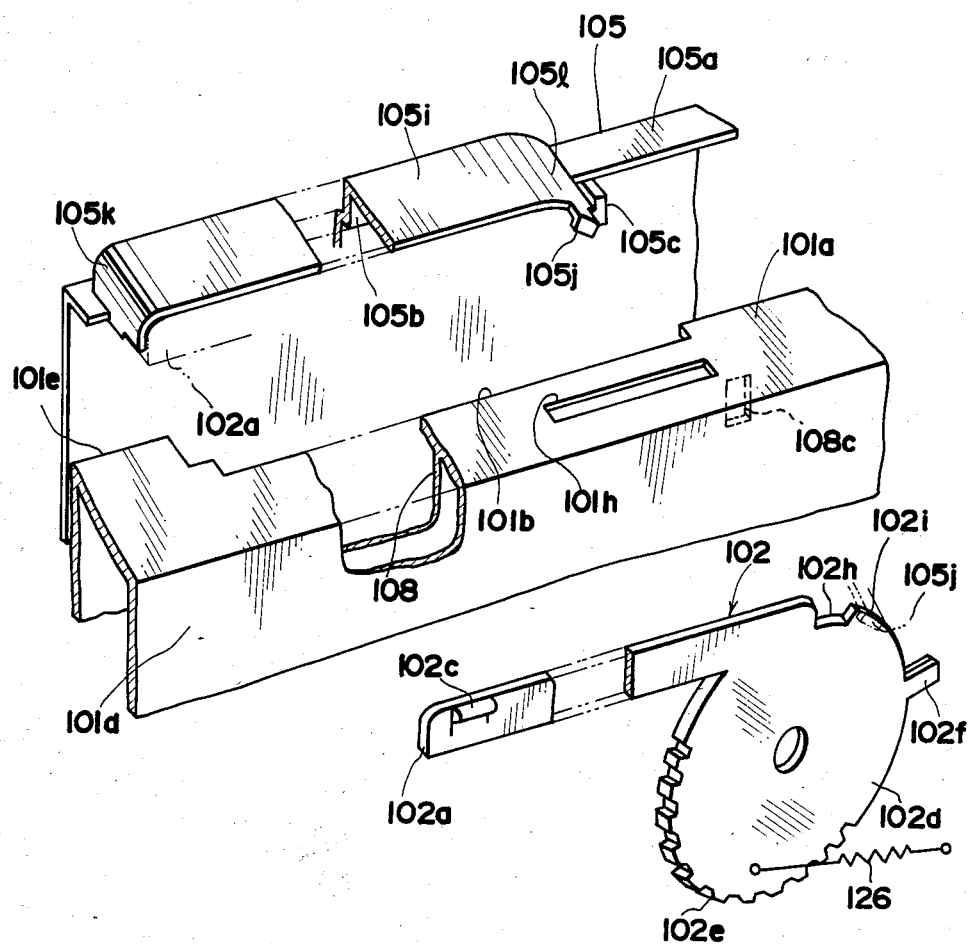
FIG. 8 is an exploded perspective view of an essential part of a camera according to a third embodiment of the present invention.

FIG. 8 is a third embodiment of the present invention. This embodiment is different from the first and second embodiments in the shape of lever, gear part of the lock member and the upper surfaces 101a, 105a of camera 101, and rear cover 105. Specifically, the U-shaped recess 101b is formed on the upper surface 101a of camera 101 by no protrusion corresponding to part 101f in the first and second embodiments is formed. In the upper surface 101a, an aperture or slot 101h is formed with which the gear part 102d of lock member 102 engages.

On the other hand, the part corresponding to the rear wall and upper wall of the lever of the first embodiment is formed on the rear cover 105 as the covering part 105i of L-shaped cross-section. The right and left ends of upper surface 105k, 105l of covering part 105i are connected to the upper surface 105a of the rear cover and are arcuate in shape. An engaging protrusion 105j projects to the front side of the camera and bending downwardly at the end part thereof is formed at the right end of the cover part 105i.

The lever part 102a of the lock member 102 is formed only with the part corresponding to the front wall of the lever of the first embodiment and the finger hook 102c is formed only at the front side. Although the gear part 102d is provided with the pawl 102f, it is not provided with the engaging part explained in the first and second embodiments and the external circumference 102i of the gear part has the function of the engaging part of said first and second embodiments. Moreover, the external circumference of the gear part is provided with the cut-away part 102h.

The operation in closing the rear cover 105 in this third embodiment is hereinafter explained. Upon opening the rear cover, the lock member 102 stops after rotating clockwise when the pawl is engaged by a leaf spring (not shown) similar to that in the first and second embodiments. When the rear cover is closed, the engaging protrusion 105j engages with the cut-away part 102h of gear part 102d and then the protrusion 105c engages the aperture 108c of wall 108 as in the case of said first and second embodiments, and abuts and presses the leaf spring (not shown). Thereby the leaf spring is deflected, releasing the engagement of pawl 102f.

The lock member 102 rotates counterclockwise under the influence of the spring 126, thereby the engaging protrusion 105j engages with the external circumference 102i of the gear part and the rear cover 105 is locked. At this time, the lever 102a collides with or comes close to the front surface of covering part 105j and covers the aperture 106. Therefore, when the film cartridge is loaded, the film cartridge protruded from the aperture 106 is perfectly covered.

On the other hand, when the lever 102a is rotated clockwise, the engaging protrusion 105j registers with the cut-away part 102h and engagement between engaging protrusion 105j and the external circumference 102i of the gear part is released and the rear cover is unlocked. Thereby, the rear cover 105 is released and the lock member 102 is fixed through engagement of the pawl 102f with the leaf spring (not shown) as in the case of the first embodiment. The operation of the exposure window cover interlocking member (not shown) is similar to that of the first embodiment.

Figure 9:
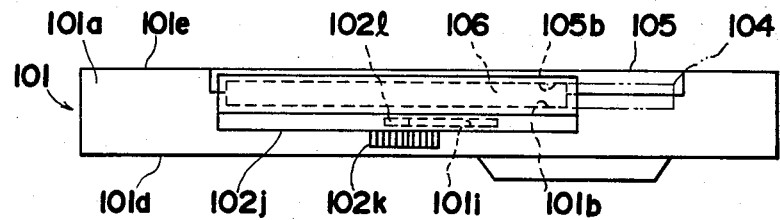
FIG. 9 is a plan view of a camera according to a fourth embodiment of the present invention.
Figure 10:
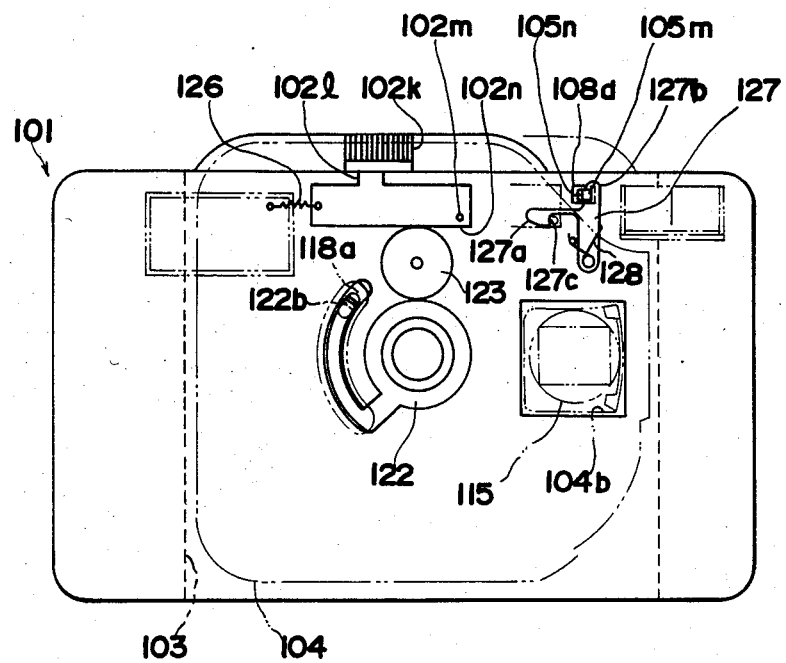
FIG. 10 is an explanatory front illustration of an internal mechanism of the camera shown in FIG. 9.
Figure 11:
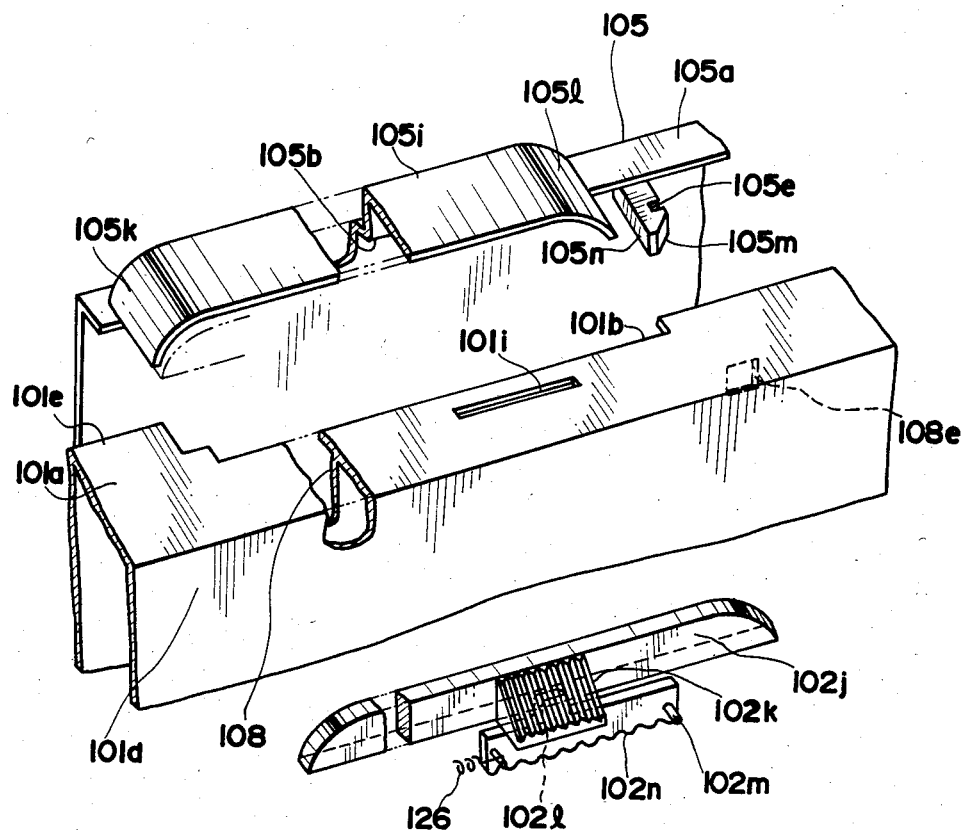
FIG. 11 is an exploded perspective view of an essential part of the camera shown in FIG. 9.

FIG. 9 to FIG. 11 show the fourth embodiment of the present invention. In this embodiment, the covering part 105i formed on the rear cover 105 is almost similar in shape to that of the third embodiment but is not provided with the engaging protrusion 105j. Moreover, the protrusion 105c is not provided and the engaging part 105n which has the common function of said protrusion 105c and said engaging protrusion 105j is formed on the rear cover 105. The engaging part 105n is provided with a groove 105e and with an inclined surface 105m at the front end part thereof.

On the other hand, the upper surface 101a of camera 101 is provided with the recess 101b which is similar to that in the first to third embodiments and a laterally extending slot-like aperture 101i. Moreover, the wall 108 is provided with the aperture 108e, opposing engaging part 105n.

The lock member 102 in this embodiment does not rotate but slides. Specifically, the lock member consists of the shielding part 102j which covers the front surface of covering part 105i, the operating part 102k formed integrally therewith, the rack part 102n, and the neck part 102l which connects the rack part 102n, the shielding part 102j engaging aperture 101i and being capable of moving along aperture 101i. The lock member 102 is urged to the left by spring 126 connected to the rack part 102n. Moreover, a pin 102m is located on the rack part 102n.

An engaging or latch member 127 is disposed to the right of and within the operating locus of rack part 102n. The engaging member 127 is pivotted so that it rotates around a transverse axis which is parallel to the axis of the taking lens and is urged counterclockwise by a spring 128. A branch part of arm 127b extends upwardly from member 127 to a position engaging part 105n of engaging member 127 and a hook 127c projects to the operation locus of the pin 102m on rack 102n from the intermediate part of branch part 127b.

The branch part 127b engages the groove 105e of engaging part 105n when it rotates counterclockwise under the influence of spring 128. The hook 127c engages the pin 102m on the rack 102n when the rack 102n moves to the extreme right, releasably preventing the movement to the left of the rack 102n.

An inclined surface 127a is formed at the end of hook 127c and when the rack 102n moves to the right, the pin 102m presses the inclined surface 127a, rotating the engaging member whereby the hook 127c does not interfere with the movement to the right of the rack 102n.

Rack 102n engages the gear 123 and said gear 123 is coupled to the exposure window cover interlocking member 122 just as in the first embodiment. The rear cover is urged in the releasing direction by a spring (not shown).

With the aforementioned construction, in case the film cartridge is already loaded, the lock member 102 is located at the extreme left position under the urging of the spring 126 and the exposure window cover interlocking member 122 rotates fully clockwise, opening the exposure window 104b of the film cartridge. The engaging member 127 engages the groove 105e of engaging part 105n extending from the rear cover 105, locking the rear cover 105 in closed condition.

When the lock member 102 is slid to the right by manually operating the operating part 102k on the occasion of removing the film cartridge, the gear 123 is rotated by the rack 102n. Moreover, the exposure window cover interlocking member 122 rotates counterclockwise, closing the exposure window cover of the film cartridge. Just before completing movement to the right of lock member 102, the pin 102n abuts the inclined surface 127a of the engaging member 127, causing the engaging member 127 to rotate clockwise so that the pin rides over the hook 127c. When the engaging member 127 rotates, the branch part 127b retracts from the groove 105e of the engaging part 105n and the rear cover 105 is unlocked. The rear cover 105 is retracted from its closed position by a spring (not shown) and the engaging part 105n separates from the aperture 108e.

When the lock member 102 moves completely to the right, the engaging member 127 rotates counterclockwise and the hook 127c latches the pin 102n and, accordingly, the lock member 102 cannot move to the left. In this case, the exposure window cover of the film cartridge is completely closed.

For loading a film cartridge, the cartridge is inserted and the rear cover 105 is closed. Just before fully closing the rear cover, the engaging part 105n is inserted into the aperture 108e, and the inclined surface 105m abuts the branch part 127b of the engaging member 127. The engaging member 127 is guided by the inclined surface 105m and rotates clockwise, releasing the engagement between the hook 127c and pin 102m.

When the rear cover 105 is fully closed, the branch part 127b of engaging member 127 is opposingly engaged with the groove 105e of engaging part 105n, completing the locking of rear cover 105. The lock member 102 moves to the left under the influence of spring 126 and the exposure window of the film cartridge is released by the exposure window cover interlocking member 122.

In each of the above described embodiments, a part which moves between a position covering the film cartridge and a position which does not cover it when the lock member 102 is operated is formed on the lock member 102, just like the lever 102a and shielding part 102j.

In each embodiment hereinafter described, such part is not formed on the lock member.

FIG. 12 to FIG. 16 show the fifth embodiment of the present invention.

Trapezoidal protrusions 101p, 105p are formed to mutually overlap on the upper surface 101a of camera 101 and the upper surface 105a of rear cover 105 and the cartridge chamber 103 for accommodating the film cartridge 104 is provided within protrusions 101p, 105p and the camera 101. On the rear cover 105, an engaging protrusion 105r is formed on the front of upper wall 105g of the protrusion 105p corresponding to almost the center area, and the cut-away part 101r which engages the protrusion 105r is provided in the upper wall 101q of the protrusion 101p in the side of camera 101 corresponding to said engaging protrusion 105r. 105s is an engaging groove formed in the lower surface of the engaging protrusion 105r.

Figure 13:
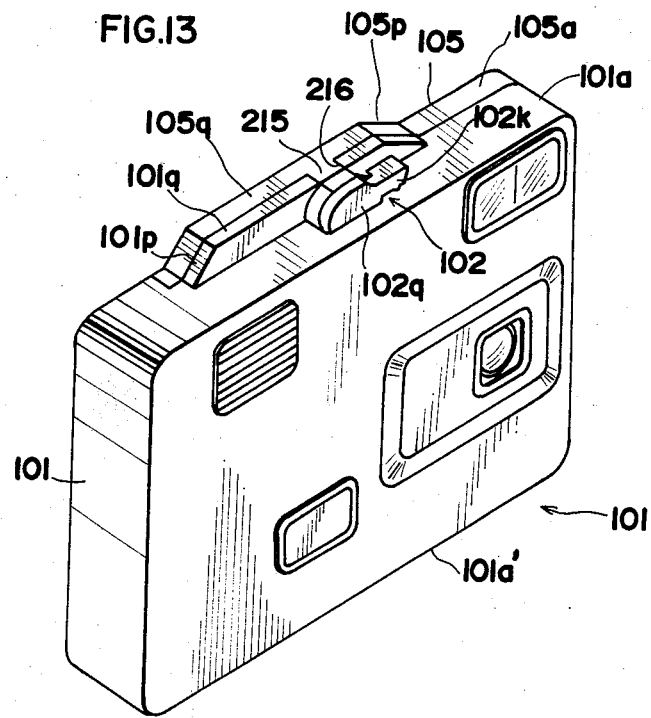
FIG. 13 is a perspective view of the camera shown in FIG. 12.
Figure 14:
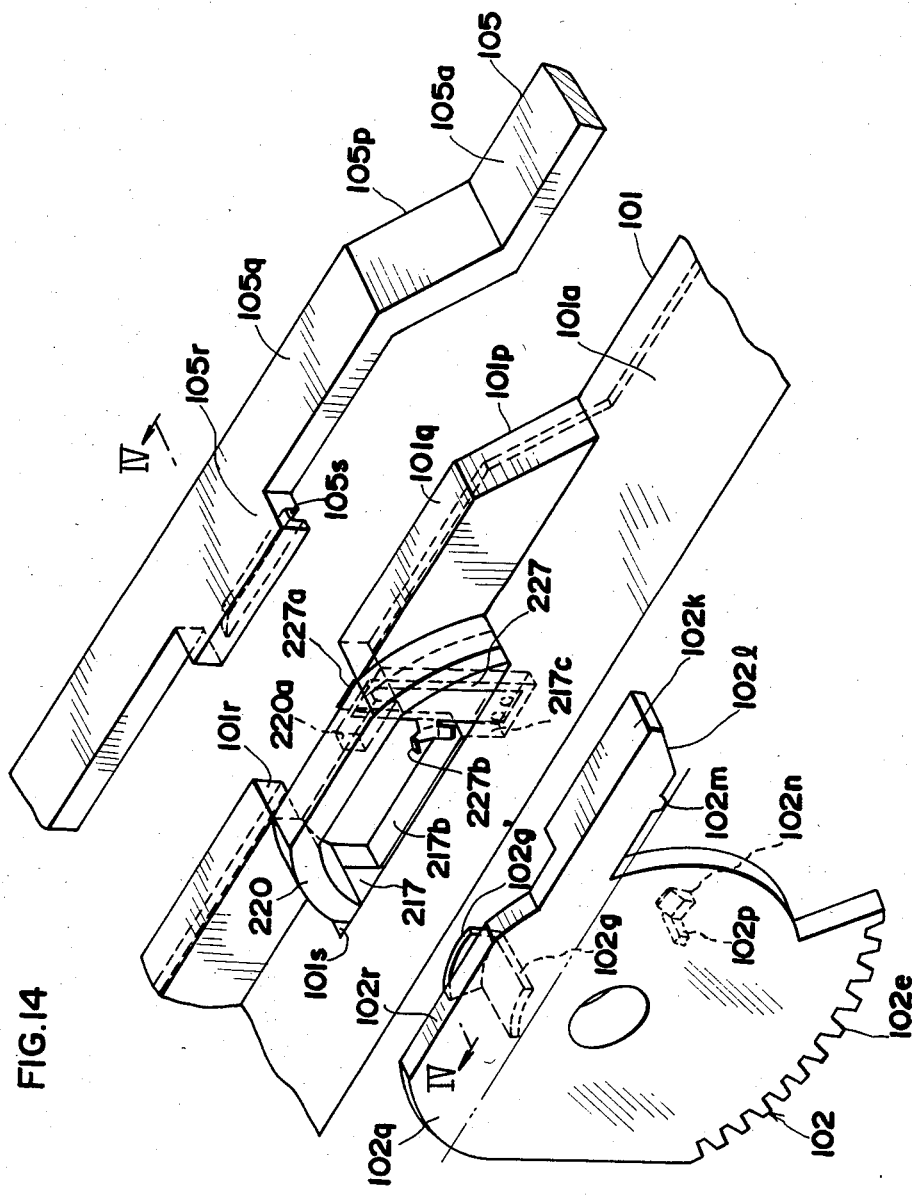
FIG. 14 is an exploded perspective view of an essential part of the camera shown in FIG. 12.
Figure 15:
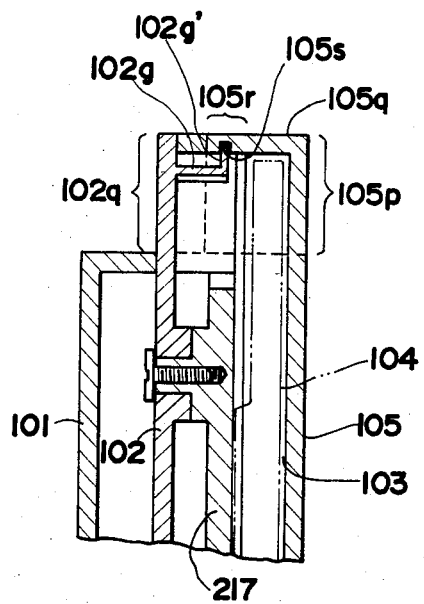
FIG. 15 is a fragmented, transverse sectional view of another essential part of the camera shown in FIG. 12.
Figure 16:
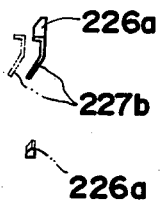
FIG. 16 is an explanatory illustration of an internal mechanism of the camera shown in FIG. 12.

As shown in FIG. 15, the lock member 102 pivotted to the upper part of the substrate 217 in the camera 101 partly projects through the aperture 101s provided at the upper surface 101a at the front side of the protrusion 101p of camera 101, and a shielding protrusion 220 is provided covering the area between protrusion 101p and the lock member 102. The lock member 102 is urged clockwise by the spring 126 and rotates opposite to that in the first to the third embodiments, but this embodiment is the same as each of said embodiments in that the cartridge exposure window 104b is opened or closed in interlocking relationship with the opening and closing of rear cover 105 by the cover member (not shown) carried by the film cartridge 104. The operating part 102k normally extends parallel with the protrusion 101p along the outside of the upper wall 101a. As shown in FIG. 13 and FIG. 14, the operating part 102k is large in size in the direction of the axis and has a structure which is convenient for operation through the formation of the inclined surface 102l at the underside of the free end of part 102k. Moreover, a detent 102m which abuts the upper wall 101a of camera 101 is also provided at the lower surface of the end of part 102k.

Figure 12:
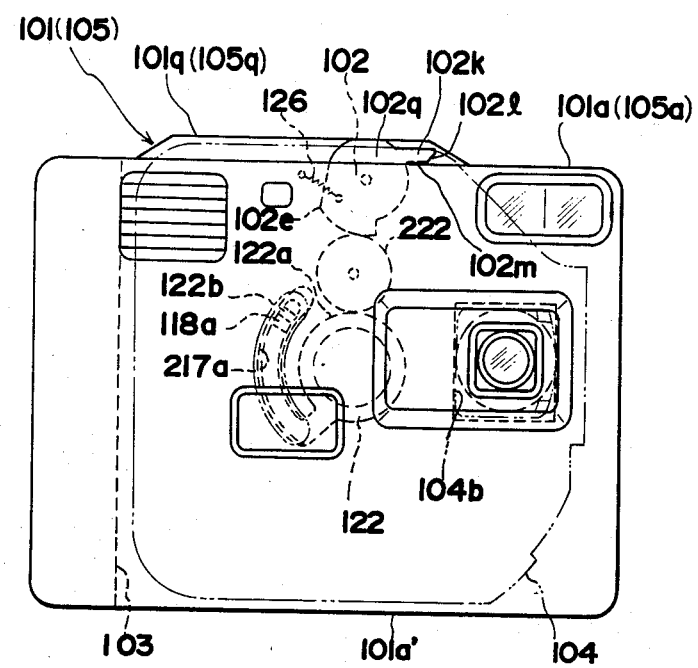
FIG. 12 is a front elevation view of a camera according to a fifth embodiment of the present invention.

The lock member 102 has gear teeth 102e at the arc portion of the lower side thereof, and said teeth 102e are coupled with the teeth part 122a of the cover drive member 122 which drives the cover member of the film cartridge through the intermediate gear 222. As shown in FIG. 12, the cover drive member 122 is provided with an arcuate aim with the pawl 122b at the end of said arm, protruding to the side of cartridge chamber 103 through the aperture 217a formed on substrate 217. When the cartridge 104 is loaded in the cartridge chamber 103, pawl 122b engages pawl 118a of the cover member. An engaging or latch part 102g extends to the rear cover 105 and the protrusion for locking 102p are respectively located at the upper and lower sides of the rear surface of the lock member 102. A bendable or flexible pawl 102g', which engages with the engaging groove 105s of the engaging protrusion 105r engaging the cut-away part 101r of the protrusion 101p when the edge or rear cover 105 is pivotted to the lower wall 101a' of camera 101 is rotated to the locked position closing the cartridge chamber 103, is formed on the engaging part 102g as a stop and a locking pawl 102n having a surface inclined to the side of rear cover 105 is located at the end part of the locking protrusion 102p.

An upper aperture 217b with which the flexible pawl 102g' engages is provided in substrate 217 to which the lock member 102 is pivotted. The lower end of a leaf spring 227 having a free upper end 227a and a flexible arm 227b projecting toward the lock member 102 at the intermediate part is located on the stepped portion 217c and face the lower side formed at the right end part of upper aperture 217b. The arm 227b of the leaf spring 227 is located in the rotating locus of pawl 102n and when the free end 227a is pressed toward the lock member 102 against the force of the leaf spring 227 by means of the front wall of engaging protrusion 105r when the rear cover 105 is closed, it is retracted from the rotating locus of the pawl 102n, 220a is a recess formed in the shielding protrusion 220 opposing to the free end 227a of the leaf spring 227, and said recess 220a accommodates the free end 227a of the leaf spring 227 pressed by the engaging protrusion 105r. The lock member 102 is set so that the upper surface of the part 102q projects to the outside of the camera to almost the height of protrusion 101p of the body and protrusion 105p of the rear cover.

The operation of the last described embodiment is explained below.

In case the rear cover 105 is to be opened when a cartridge 104 is in the cartridge chamber 103 and the rear cover 105 is closed, the operating part 102k is raised by placing a finger on the inclined surface 102l at the end part of operation part 102k and the lock member 102 is rotated counterclockwise around the axis against the force of spring 126. Interlocking with such rotation, the exposure window cover drive member 122 coupled to the teeth 102e of lock member 102 is rotated counterclockwise through the intermediate gear 222, and the cover member (not shown) which has caused the exposure window 104b of cartridge 104 to open is moved to the position shielding the exposure window 104b. Simultaneously, the pawl 102g' of the engaging part 102g is moved in a direction to disengage groove 105s formed at the lower side of engaging protrusion 105r of the rear cover, the pawl 102n passes (refer to FIG. 16) behind the arm 227b of the leaf spring 227 whose free end 227a is pressed to the recess 220a of the shielding protrusion 220 by the engaging protrusion 105r and the bending pawl 102g' is released from engagement with the engaging groove 105s. In this case, the exposure window of the film cartridge is already shielded from the light by the cover member.

Therefore, the rear cover 105 which has been released from the lock member 102 is pressed by the free end 227 of the leaf spring 227 automatically allowing access to the cartridge chamber 103. When the rear cover 105 opens, the leaf spring 227 which has been freed from the pressure by the engaging protrusion 105r is resiliently moved toward rear cover 105. Therefore, arm 227b enters the operating locus of pawl 102n, stopping the pawl 102n of the lock member 102 urged clockwise by the spring 126 against the force of the spring 126 (refer to FIG. 16) and, therefore, the lock member 102 is held at the releasing position. Thus, the film cartridge 104 loaded in the cartridge chamber 103 can be removed from the releasing area of film chamber through the area opened by rear cover 105 and a new film cartridge 104 can be loaded.

In the closing of the cartridge chamber 13, when the rear cover 105 is pressed in a closing direction around the pivotting area, the engaging protrusion 105r of rear cover protrusion 105p engages the cut-away part 101r of protrusion 101p, pressing the free end 227a of the leaf spring 227 into the recess 220a of shielding protrusion 220 against the spring influence with the front wall of such engaging protrusion. Thereby, the spring arm 227b draws back to the position indicated by broken line from the rotating locus of pawl 102n indicated by solid line in FIG. 16. When the spring arm draws back, the lock member 102 being held at the release position against the influence of spring 126 is freed and is rotated clockwise by the spring 126. The pawl 102g' engages the groove 105s of rear cover 105 and the protrusion 102m formed at the lower part of the operating part 102k the rotation at the lock position where it abuts the upper wall 101a of camera 101 when the rear cover 105 is located at the closed position.

The film window cover drive member 122 which is rotated in the same direction as the clockwise rotation of the rear cover 105 causes the cover member (not shown) located at the shielding position of the exposure window of film cartridge 104 to draw back from the shielding position through the end part being at area 122b in order to open the exposure window, thus completing the preparation for picture-taking. When the lock member 102 is located at the lock position shown in FIG. 12 and FIG. 13, the operating part 102k which abuts the upper wall 101a at the protrusion 102m is located opposing the front wall of the protrusion 101p and extends in the direction almost parallel to the upper wall 101a of the camera 101. The top surface 102r of lock member 102 positioned at the outside of the camera is in almost the same plane as the protruded upper surfaces 101q and 105q of the protrusion 101p and rear cover protrusion 105p and does not increase the height of the camera body as a whole.

Figure 17:
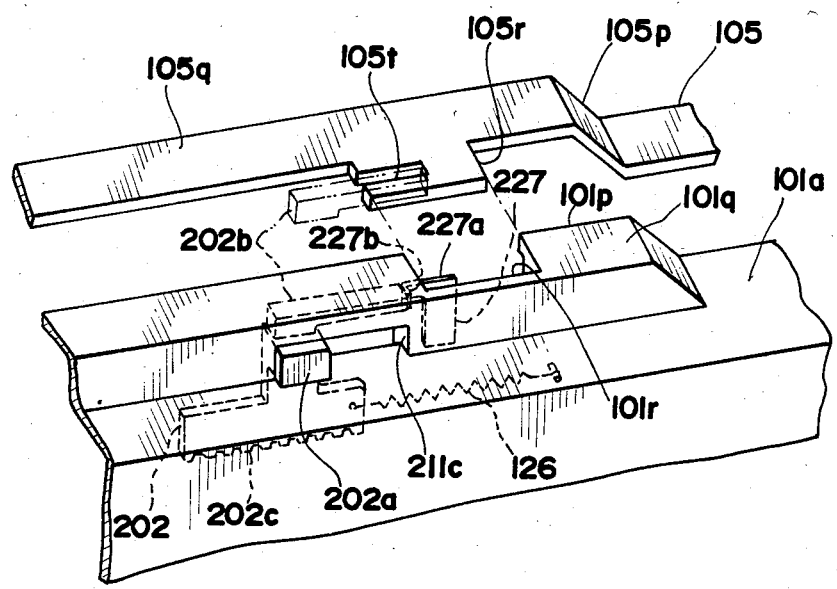
FIG. 17 is an exploded perspective view of an essential part of a camera according to a sixth embodiment of the present invention.

FIG. 17 shows the sixth embodiment of the present invention. The lock member pivotted to the substrate as in the fifth embodiment can slide to the right and left almost parallel with the upper wall of the camera as in the case of the fourth embodiment.

In this embodiment, the engaging protrusion 105r of the protruding upper wall surface 105q of rear cover 105 is provided with a slot-shaped cut-away part 105t and the operating part 202a of lock member 202 is arranged in the recess 101u formed at the front wall 101t of the protrusion 101p. The lock member 202 is urged to the right by the spring 126, having the pawl 202b as a stop which engages with cut-away part 105t at the upper part thereof and a rack gear 202c for transmission in rotating the same cover drive member 122 as that shown in FIG. 12 at the lower end thereof.

As in the case of the fifth embodiment, the free end 227a of the leaf spring member 227 is located at the front side of the front wall of the engaging protrusion 105r. When the rear cover 105 is opened, the arm 227b of spring member 227 is placed within the moving locus of the pawl 202b as a stop in order to block the movement thereof. Thereby, the lock member 202 is shifted to release position against the influence of spring 126.

Therefore, in the case of this embodiment, when the rear cover 105 moves in the closing direction, the engaging protrusion 105r engages the cut-away 101r of the protrusion 101p, pressing the free end 227a of spring member 227 located in cut-away 101r with the front wall thereof and causing the arm 227b to draw back to the outside of the movement locus of the pawl 202b. Thereby, engagement of pawl 202b by the arm 227b is released. Therefore, the lock member 202 is moved to the right by spring 126, the pawl 202b engages the cut-away part 105t of rear cover 105 whereby the rear cover 105 is locked in closed position and, simultaneously, the cover drive member having the gear part (not shown) engaging the gear 202c is rotated and the exposure window 104b of cartridge 104 shown in FIG. 12 opens, completing the preparation for taking a picture.

The film cartridge 104 loaded in the camera can be removed by the following procedure. When the operating part 202a of the lock member 202 is moved to the left to the position shown in FIG. 17 against the force of spring 126, the exposure window 104b of film cartridge 104 is shielded by the covering member, owing to the cover drive member which is rotated, interlocking with the movement to the left of the gear 202c for transmission in the reverse direction to that when the rear cover 105 is closed, the pawl 202b which is moved to the left with the operating part 202a separates from the cut-away part 105r of the engaging protrusion 105r whereby the locking in closed position of rear cover 105 is cancelled. Upon unlocking, the rear cover 105 is pressed at the front wall by the free end 227a of spring member 227. The cartridge chamber 103 is thus opened and the arm 227b of spring 227 enters the moving locus of the pawl 202b interfering with the movement to the right thereof. The lock member 202 is thus kept in the unlock position.

Accordingly, this embodiment achieves the same effect as that obtained by the earlier described embodiments without the lock member 202 protruding from the upper surfaces 101q, 105q of the protrusion 101p of the body and protrusion 105p of the rear cover.

What is claimed is:

1. A thin disc camera for use with a disc film cartridge having an exposure aperture in a front wall thereof, comprising:

a transversely thin body member of generally parallelpiped shape and having upper, lower and front walls and having formed therein a film cartridge chamber open at its rear to receive said film cartridge, in such a manner that the front wall of said film cartridge is parallel with said front wall of said body member;

a rear cover movable between covering and uncovering positions covering and uncovering said film cartridge chamber and having upper and lower walls;

said upper walls of said body member and said rear cover defining the upper wall of the camera and the lower walls of said body member and said rear cover defining the lower wall of the camera, the distance between said camera upper and lower walls being less than the height of said film cartridge received in said cartridge chamber;

means for shielding said exposure aperture of said film cartridge received in said cartridge chamber;

and wherein at least one of said camera upper and lower walls is formed with an opening for permitting a part of said film cartridge to project from said film cartridge chamber.

2. A camera as recited in claim 1, further comprising a means for covering said projecting part of the film cartridge.

3. A camera as recited in claim 2, further comprising a locking means operable between a locking position for locking the rear cover in the covering position and an unlocking position for permitting the rear cover to move to the uncovering position.

4. A camera as recited in claim 3, wherein said locking means includes said covering means as a part thereof such that said covering means covers said projecting part of the film cartridge at the locking position of said locking means.

5. A camera as recited in claim 3, wherein said covering means includes a first part formed on the locking means, and a second part formed on the rear cover.

6. A camera as recited in claim 3, wherein said covering means includes a first part formed on the body member, and a second part formed on the rear cover.

7. A camera as recited in claim 1, wherein said shielding means includes a frame which is fitted with said exposure aperture of the film cartridge housed in the film cartridge chamber when the rear cover is in the covering position.

8. A camera as recited in claim 6, wherein said locking means is located in front of said first part of the covering means and arranged no higher than the upper surface of the covering means.

9. A thin disc camera for use with a disc film cartridge having an exposure aperture in a front wall thereof, comprising:

a transversely thin body member of generally parallelpiped shape and having upper, lower and front walls and having formed therein a film cartridge chamber open at its rear to receive said film cartridge, in such a manner that the front wall of said film cartridge is parallel with said front wall of said body member;

a rear cover movable between covering and uncovering positions covering and uncovering said film cartridge chamber and having upper and lower walls;

said camera upper wall being defined by at least one of said upper walls of said body member and said rear cover and having first and second portions, said first portion being located immediately above said cartridge chamber and said second portion being located laterally above said cartridge chamber;

said camera lower wall being defined by at least one of said lower walls of said body member and said rear cover and having first and second portions, said first portion being located immediately below said cartridge chamber while said second portion being located laterally below said cartridge chamber;

and wherein the distance between said first portions of said camera upper and lower walls is greater than the height of said film cartridge received in said cartridge chamber such that said upper and lower walls of said film cartridge chamber are defined by said first portions of said upper and lower camera walls and the distance between said second portions of said camera upper and lower walls is less than the height of said film cartridge received in said cartridge chamber.

10. A camera as recited in claim 9, further comprising a locking means movable between locking position for locking the rear cover in the covering position and unlocking position for permitting the rear cover moving to the uncovering position.

11. A camera as recited in claim 10, wherein said locking means is located in front of said first portion of said camera upper wall and arranged not to project upwardly from the upper surface of said first portion of said camera upper wall.

* * * * *